(12) United States Patent
Baek et al.

(10) Patent No.: US 7,800,634 B2
(45) Date of Patent: Sep. 21, 2010

(54) METHOD OF ROTATING IMAGE, COMPUTER, AND RECORDING MEDIA

(75) Inventors: Joung-hum Baek, Suwon-si (KR); Cheon-yong Cho, Yongin-si (KR); Young-nam Oh, Seongnam-si (KR); R. Jai Pravinchandra, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 392 days.

(21) Appl. No.: 11/140,977

(22) Filed: Jun. 1, 2005

(65) Prior Publication Data

US 2006/0038834 A1    Feb. 23, 2006

(30) Foreign Application Priority Data

Aug. 18, 2004    (KR) ...................... 10-2004-0065181

(51) Int. Cl.
    G09G 5/00    (2006.01)
(52) U.S. Cl. ........................ 345/649; 345/656; 345/658
(58) Field of Classification Search ................. 345/648, 345/649, 658, 659, 545, 656
    See application file for complete search history.

(56) References Cited

U.S. PATENT DOCUMENTS

| 4,542,377 A | 9/1985 | Hagen et al. |
| 4,831,368 A | 5/1989 | Masimo et al. |

(Continued)

FOREIGN PATENT DOCUMENTS

| CN | 1178591 | 4/1998 |

(Continued)

OTHER PUBLICATIONS

PCT Search Report issued on Nov. 14, 2005 for PCT/KR2005/002645.

(Continued)

*Primary Examiner*—M Good Johnson
(74) *Attorney, Agent, or Firm*—Stazione & Kim LLP

(57) ABSTRACT

A method of rotating an image based on image data including a plurality of pixels per a line, the method including setting the number of pixel data forming the pixel; sequentially storing the pixel data in a first memory according to the order of the line and the pixel; calculating the number of entire image data on the basis of the number of pixel data, the line number of the image data, and the number of pixels per line; setting an image rotation angle; calculating a location value of each pixel data in a second memory on the basis of the number of pixel data per pixel, the line number of the image data, the number of pixels per line, and the number of the entire data by independent processes in consideration of the setting image rotation angle; and storing the image data from the first memory in the second memory on the basis of the calculated location value of each pixel data in the second memory with regard to each pixel data. Thus a method of transforming image data corresponding to a video signal transmitted to a display, and displaying an image based on the image data to be rotated on the display, a computer and a recording media is achieved. Further a method of gaining image data corresponding to a rotated image by different processes or equations according to rotated angles of an input image rotating an image, a computer and a recording media.

30 Claims, 11 Drawing Sheets

| | | |
|---|---|---|
| 5,134,390 A | 7/1992 | Kishimoto et al. |
| 5,329,289 A | 7/1994 | Sakamoto et al. |
| 5,384,645 A * | 1/1995 | Hasegawa et al. ............ 358/444 |
| 5,426,733 A | 6/1995 | Masui .......................... 345/574 |
| 5,577,182 A * | 11/1996 | Hayashi ...................... 345/657 |
| 5,729,529 A | 3/1998 | Martinsson |
| 5,774,233 A | 6/1998 | Sakamoto |
| 5,854,641 A | 12/1998 | Howard et al. |
| 5,956,049 A | 9/1999 | Cheng |
| 5,966,116 A * | 10/1999 | Wakeland .................... 345/658 |
| 5,966,138 A * | 10/1999 | Tanaka ........................ 345/658 |
| 5,973,664 A * | 10/1999 | Badger ........................ 345/649 |
| 6,104,843 A * | 8/2000 | Nakashima ................. 382/305 |
| 6,208,767 B1* | 3/2001 | Chapin ........................ 345/648 |
| 6,608,626 B2* | 8/2003 | Chan ........................... 345/572 |
| RE38,471 E * | 3/2004 | Howard et al. .............. 345/545 |
| 6,760,035 B2* | 7/2004 | Tjandrasuwita ............. 345/545 |
| 7,333,097 B2* | 2/2008 | Chee et al. ................... 345/204 |
| 2002/0021305 A1* | 2/2002 | Cheng ......................... 345/658 |
| 2003/0026501 A1* | 2/2003 | Mei et al. .................... 382/293 |
| 2004/0239690 A1* | 12/2004 | Wyatt et al. ................. 345/649 |

FOREIGN PATENT DOCUMENTS

| | | |
|---|---|---|
| CN | 1385824 | 12/2002 |
| JP | 6021079 | 1/1994 |

OTHER PUBLICATIONS

Chinese Office Action dated Jan. 18, 2008 issued in CN 2005-277174.
Visual C++ Digital Image Processing; Post & Telecommunications Press; pp. 14-15, 35, 194-196.
Chinese Office Action dated Sep. 12, 2008 issued in CN 2005-80027717.4.

* cited by examiner

FIG. 8

First Memory Address

| 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
|----|----|----|----|----|----|----|----|----|----|----|----|----|----|----|----|----|----|----|----|----|----|----|----|
| 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 |

Image Data

| D11 | D12 | D13 | D14 | D21 | D22 | D23 | D24 | D31 | D32 | D33 | D34 | D41 | D42 | D43 | D44 | D51 | D52 | D53 | D54 | D81 | D82 | D83 | D84 |
|-----|-----|-----|-----|-----|-----|-----|-----|-----|-----|-----|-----|-----|-----|-----|-----|-----|-----|-----|-----|-----|-----|-----|-----|
| C11 | C12 | C13 | C14 | C21 | C22 | C23 | C24 | C31 | C32 | C33 | C34 | C41 | C42 | C43 | C44 | C51 | C52 | C53 | C54 | C81 | C82 | C83 | C84 |
| B11 | B12 | B13 | B14 | B21 | B22 | B23 | B24 | B31 | B32 | B33 | B34 | B41 | B42 | B43 | B44 | B51 | B52 | B53 | B54 | B81 | B82 | B83 | B84 |
| A11 | A12 | A13 | A14 | A21 | A22 | A23 | A24 | A31 | A32 | A33 | A34 | A41 | A42 | A43 | A44 | A51 | A52 | A53 | A54 | A81 | A82 | A83 | A84 |

FIG. 9

| | | | | | | | | | | | | | | | | | | | | | | | |
|---|---|---|---|---|---|---|---|---|---|---|---|---|---|---|---|---|---|---|---|---|---|---|---|
| | 1072 | 1073 | 1074 | 1075 | 1076 | 1077 | 1078 | 1079 | 1080 | 1081 | 1082 | 1083 | 1084 | 1085 | 1086 | 1087 | | 1090 | 1091 | 1092 | 1093 | 1094 | 1095 |
| | 1048 | 1049 | 1050 | 1051 | 1052 | 1053 | 1054 | 1055 | 1056 | 1057 | 1058 | 1059 | 1060 | 1061 | 1062 | 1063 | 1064 | 1065 | | 1066 | 1067 | 1068 | 1069 | 1070 | 1071 |
| | 1024 | 1025 | 1026 | 1027 | 1028 | 1029 | 1030 | 1031 | 1032 | 1033 | 1034 | 1035 | 1036 | 1037 | 1038 | 1039 | 1040 | 1041 | 1042 | 1043 | 1044 | 1045 | 1046 | 1047 |
| | 1000 | 1001 | 1002 | 1003 | 1004 | 1005 | 1006 | 1007 | 1008 | 1009 | 1010 | 1011 | 1012 | 1013 | 1014 | 1015 | 1016 | 1017 | 1018 | 1019 | 1020 | 1021 | 1022 | 1023 |

Second Memory Address

Image Data (180°)

| A 81 | A 82 | A 83 | A 84 | A 51 | A 52 | A 53 | A 54 | A 41 | A 42 | A 43 | A 44 | A 31 | A 32 | A 33 | A 34 | A 21 | A 22 | A 23 | A 24 | A 11 | A 12 | A 13 | A 14 |
| B 81 | B 82 | B 83 | B 84 | B 51 | B 52 | B 53 | B 54 | B 41 | B 42 | B 43 | B 44 | B 31 | B 32 | B 33 | B 34 | B 21 | B 22 | B 23 | B 24 | B 11 | B 12 | B 13 | B 14 |
| C 81 | C 82 | C 83 | C 84 | C 51 | C 52 | C 53 | C 54 | C 41 | C 42 | C 43 | C 44 | C 31 | C 32 | C 33 | C 34 | C 21 | C 22 | C 23 | C 24 | C 11 | C 12 | C 13 | C 14 |
| D 81 | D 82 | D 83 | D 84 | D 51 | D 52 | D 53 | D 54 | D 41 | D 42 | D 43 | D 44 | D 31 | D 32 | D 33 | D 34 | D 21 | D 22 | D 23 | D 24 | D 11 | D 12 | D 13 | D 14 |

FIG. 10

| Second Memory Address ||||||||||||||||
|---|---|---|---|---|---|---|---|---|---|---|---|---|---|---|---|
| 1080 | 1081 | 1082 | 1083 | 1084 | 1085 | 1086 | 1087 | 1088 | 1089 | 1090 | 1091 | 1092 | 1093 | 1094 | 1095 |
| 1064 | 1065 | 1066 | 1067 | 1068 | 1069 | 1070 | 1071 | 1072 | 1073 | 1074 | 1075 | 1076 | 1077 | 1078 | 1079 |
| 1048 | 1049 | 1050 | 1051 | 1052 | 1053 | 1054 | 1055 | 1056 | 1057 | 1058 | 1059 | 1060 | 1061 | 1062 | 1063 |
| 1032 | 1033 | 1034 | 1035 | 1036 | 1037 | 1038 | 1039 | 1040 | 1041 | 1042 | 1043 | 1044 | 1045 | 1046 | 1047 |
| 1016 | 1017 | 1018 | 1019 | 1020 | 1021 | 1022 | 1023 | 1024 | 1025 | 1026 | 1027 | 1028 | 1029 | 1030 | 1031 |
| 1000 | 1001 | 1002 | 1003 | 1004 | 1005 | 1006 | 1007 | 1008 | 1009 | 1010 | 1011 | 1012 | 1013 | 1014 | 1015 |
| Image Data(-90°) ||||||||||||||||
| A11 | A12 | A13 | A14 | B11 | B12 | B13 | B14 | C11 | C12 | C13 | C14 | D11 | D12 | D13 | D14 |
| A21 | A22 | A23 | A24 | B21 | B22 | B23 | B24 | C21 | C22 | C23 | C24 | D21 | D22 | D23 | D24 |
| A31 | A32 | A33 | A34 | B31 | B32 | B33 | B34 | C31 | C32 | C33 | C34 | D31 | D32 | D33 | D34 |
| A41 | A42 | A43 | A44 | B41 | B42 | B43 | B44 | C41 | C42 | C43 | C44 | D41 | D42 | D43 | D44 |
| A51 | A52 | A53 | A54 | B51 | B52 | B53 | B54 | C51 | C52 | C53 | C54 | D51 | D52 | D53 | D54 |
| A61 | A62 | A63 | A64 | B61 | B62 | B63 | B64 | C61 | C62 | C63 | C64 | D61 | D62 | D63 | D64 |

FIG. 11

| Second Memory Address | | | | | | | | | | | | | | | |
|---|---|---|---|---|---|---|---|---|---|---|---|---|---|---|---|
| 1080 | 1081 | 1082 | 1083 | 1084 | 1085 | 1086 | 1087 | 1088 | 1089 | 1090 | 1091 | 1092 | 1093 | 1094 | 1095 |
| 1064 | 1065 | 1066 | 1067 | 1068 | 1069 | 1070 | 1071 | 1072 | 1073 | 1074 | 1075 | 1076 | 1077 | 1078 | 1079 |
| 1048 | 1049 | 1050 | 1051 | 1052 | 1053 | 1054 | 1055 | 1056 | 1057 | 1058 | 1059 | 1060 | 1061 | 1062 | 1063 |
| 1032 | 1033 | 1034 | 1035 | 1036 | 1037 | 1038 | 1039 | 1040 | 1041 | 1042 | 1043 | 1044 | 1045 | 1046 | 1047 |
| 1016 | 1017 | 1018 | 1019 | 1020 | 1021 | 1022 | 1023 | 1024 | 1025 | 1026 | 1027 | 1028 | 1029 | 1030 | 1031 |
| 1000 | 1001 | 1002 | 1003 | 1004 | 1005 | 1006 | 1007 | 1008 | 1009 | 1010 | 1011 | 1012 | 1013 | 1014 | 1015 |
| Image Data(+90°) | | | | | | | | | | | | | | | |
| D61 | D62 | D63 | D64 | C61 | C62 | C63 | C64 | B61 | B62 | B63 | B64 | A61 | A62 | A63 | A64 |
| D51 | D52 | D53 | D54 | C51 | C52 | C53 | C54 | B51 | B52 | B53 | B54 | A51 | A52 | A53 | A54 |
| D41 | D42 | D43 | D44 | C41 | C42 | C43 | C44 | B41 | B42 | B43 | B44 | A41 | A42 | A43 | A44 |
| D31 | D32 | D33 | D34 | C31 | C32 | C33 | C34 | B31 | B32 | B33 | B34 | A31 | A32 | A33 | A34 |
| D21 | D22 | D23 | D24 | C21 | C22 | C23 | C24 | B21 | B22 | B23 | B24 | A21 | A22 | A23 | A24 |
| D11 | D12 | D13 | D14 | C11 | C12 | C13 | C14 | B11 | B12 | B13 | B14 | A11 | A12 | A13 | A14 |

METHOD OF ROTATING IMAGE, COMPUTER, AND RECORDING MEDIA

CROSS-REFERENCE TO RELATED APPLICATIONS

This application claims the benefit of Korean Patent Application No. 2004-65181, filed on Aug. 18, 2004, in the Korean Intellectual Property Office, the disclosure of which is incorporated herein in its entirety by reference.

BACKGROUND OF THE INVENTION

1. Field of the Invention

The present general inventive concept relates to a method of rotating an image, a computer, and a recording media, and more particularly, to a method of gaining image data corresponding to a rotated image by different processes or equations according to rotated angles of an input image rotating an image, a computer and a recording media.

2. Description of the Related Art

Generally, a display comprises a screen based on standards that allows the screen to have a larger width than height, as shown in FIG. 1.

Such standards for the display reflects a landscape format due to an image provided to the display generally having a larger width than height.

However, this type of display screen is not suitable for a portrait format of an image that has a larger height than width. Particularly, in the case of a computer system, a computer mostly includes application programs such as a word processor, etc., which provides an image as the portrait format, so that the screen for the landscape format is not efficiently used because the image from the computer is not fully displayed thereon. Further, a user is inconvenienced in using the application programs.

Accordingly, there has been developed a pivotable display to display both the image as the landscape format and the image as the portrait format on one display.

Here, to substantially display both the image as the landscape format and the image as the portrait format on one display, the image should be rotated in correspondence with pivoting of the display itself.

Therefore, a video signal transmitted to the display should be transformed to rotate the image displayed on the screen of the display in correspondence with pivoting of the display, as shown in FIG. 2.

SUMMARY OF THE INVENTION

Accordingly, the present general inventive concept provides a method of transforming image data corresponding to a video signal transmitted to a display, and displaying an image based on the image data to be rotated on the display, a computer and a recording media.

The present general inventive concept also provides a method of gaining image data corresponding to a rotated image by different processes or equations according to rotated angles of an input image rotating an image, a computer and a recording media.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a method of rotating an image based on image data comprising a plurality of pixels per line, the method comprising setting the number of pixel data forming the pixel; sequentially storing the pixel data in a first memory according to the order of the line and the pixel; calculating the number of entire image data on the basis of the number of pixel data, the number of image data lines, and the number of pixels per line; setting an image rotation angle; calculating a location value of each pixel data in a second memory on the basis of the number of pixel data per pixel, the line number of the image data, the number of pixels per line, and the number of the entire data by independent processes in consideration of the setting image rotation angle; and storing the image data from the first memory in the second memory on the basis of the calculated location value of each pixel data in the second memory with regard to each pixel data.

The setting of an image rotation angle may include one among +90 degrees, −90 degrees, and 180 degrees.

The independent processes may comprise a first process performed when the setting of an image rotation angle is of 180 degrees, the first process comprising calculating a decrement parameter on the basis of the number of the entire data, the number of pixel data, and the location value of the corresponding pixel data in the first memory; and calculating the location value of each pixel data in the second memory on the basis of the location value of each pixel data in the first memory, and the decrement parameter.

The location value of each pixel data in the second memory may be calculated by an equation as follows: new_byte_address=old_byte_address+byte_shift, where the new_byte_address is the location value of each pixel data in the second memory, the old_byte_address is the location value of each pixel data in the first memory, and the byte_shift is the decrement parameter.

The decrement parameter may be decreased by twice the number of pixel data according to the location value order of the pixel data in the first memory.

The independent processes may comprise a second process performed when the setting of an image rotation angle is of −90 degrees, and the second process may comprise calculating the number of lines of which the location value in the second memory is completely calculated; calculating the number of pixels of which the location value of the corresponding line in the second memory is completely calculated; calculating the number of pixel data of which the location value of the corresponding pixel in the second memory is completely calculated; and calculating the location value of each pixel data in the second memory on the basis of the number of entire data, the number of lines, the number of pixels per line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

The location value of each pixel data in the second memory is calculated by an equation as follows: new_byte_address=total_bytes−{(X_resolution−1−completed_lines)×bytes_per_pixel+completed_pixels_in_line×bytes_per_column+bytes_per_pixel−completed_bytes_in_pixel}, where the new_byte_address is the location value of each pixel data in the second memory, the total_bytes is the number of total data, the X_resolution is the number of lines, the completed_lines is the number of lines whose location value in the second memory is completely calculated, the bytes_per_pixel is the number of pixel data, the completed- _pixels_in_line is the number of pixels whose location value of the corresponding line in the second memory is completely calculated, the bytes_per_column is calculated by multiplication of the number of lines and the number of pixel data, and the completed_bytes_in_pixel is the number of pixel data whose location value of the corresponding pixel in the second memory is completely calculated.

The independent processes may comprise a third process performed when the setting of an image rotation angle is of +90 degrees, and the third process may comprise calculating the number of lines of which the location value in the second memory is completely calculated; calculating the number of pixels of which the location value of the corresponding line in the second memory is completely calculated; calculating the number of pixel data of which the location value of the corresponding pixel in the second memory is completely calculated; and calculating the location value of each pixel data in the second memory on the basis of the number of lines, the number of pixels per the line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

The location value of each pixel data in the second memory may be calculated by an equation as follows:

new_byte_address=(X_resolution−1−completed_lines)×bytes_per_pixel+completed_pixels_in_line×bytes_per_column+completed_bytes_in_pixel, where the new_byte_address is the location value of each pixel data in the second memory, the X_resolution is the number of lines, the completed_lines is the number of lines whose location value in the second memory is completely calculated, the bytes_per_pixel is the number of pixel data, the completed_pixels_in_line is the number of pixels whose location value of the corresponding line in the second memory is completely calculated, the bytes_per_column is calculated by multiplication of the number of lines and the number of pixel data, and the completed_bytes_in_pixel is the number of pixel data whose location value of the corresponding pixel in the second memory is completely calculated.

The calculating the location value of each pixel data in the second memory may comprise setting an initial location value in the second memory and reflecting the initial location value to the calculated location value in the second memory.

The location values in the first memory and the second memory may be used as addresses to store the pixel data.

The foregoing and/or other aspects and advantages of the present general inventive concept are also achieved by providing a computer outputting a video signal to a display, comprising a first memory to store image data comprising a plurality of pixels per line, each pixel comprising at least one pixel data; a second memory; a rotation angle input part to input a rotation angle of an image; an image converter that calculates the number of entire image data on the basis of pixel data per pixel, the line number of the image data, and the number of pixels per line, calculates a location value of each pixel data in the second memory using independent processes on the basis of pixel data per pixel, the line number of the image data, the number of pixels per line, and the number of entire image data with regard to the image rotation angle inputted through the rotation angle input part, and stores the image data from the first memory in the second memory on the basis of the calculated location value of each pixel data in the second memory; and a graphic adapter to output the video signal on the basis of the image data stored in the second memory.

The inputted rotation angle may include one among +90 degrees, −90 degrees, and 180 degrees.

The independent processes performed by the image converter may comprise a first process performed when the setting image rotation angle is of 180 degrees, the first process comprising calculating a decrement parameter on the basis of the number of the entire data, the number of pixel data, and the location value of the corresponding pixel data in the first memory; and calculating the location value of each pixel data in the second memory on the basis of the location value of each pixel data in the first memory, and the decrement parameter.

The image converter retrieves an initial location value in the second memory and reflects the initial location value to the calculated location value in the second memory.

The foregoing and/or other aspects and advantages of the present general inventive concept are also achieved by providing a recording media that records a computer program to perform the method described above to rotate an image and is readable by a computer.

The setting of an image rotation angle may include one among +90 degrees, −90 degrees, and 180 degrees.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 8 illustrates relation between image data stored in a first memory and location values of pixel data in the image data according to an embodiment of the present general inventive concept; and FIGS. 9 through 11 illustrates relation between the image data stored in a second memory and the location values of the pixel data in the image data according to an embodiment of the present general inventive concept.

DETAILED DESCRIPTION OF THE PREFERRED EMBODIMENTS

Figure 1:
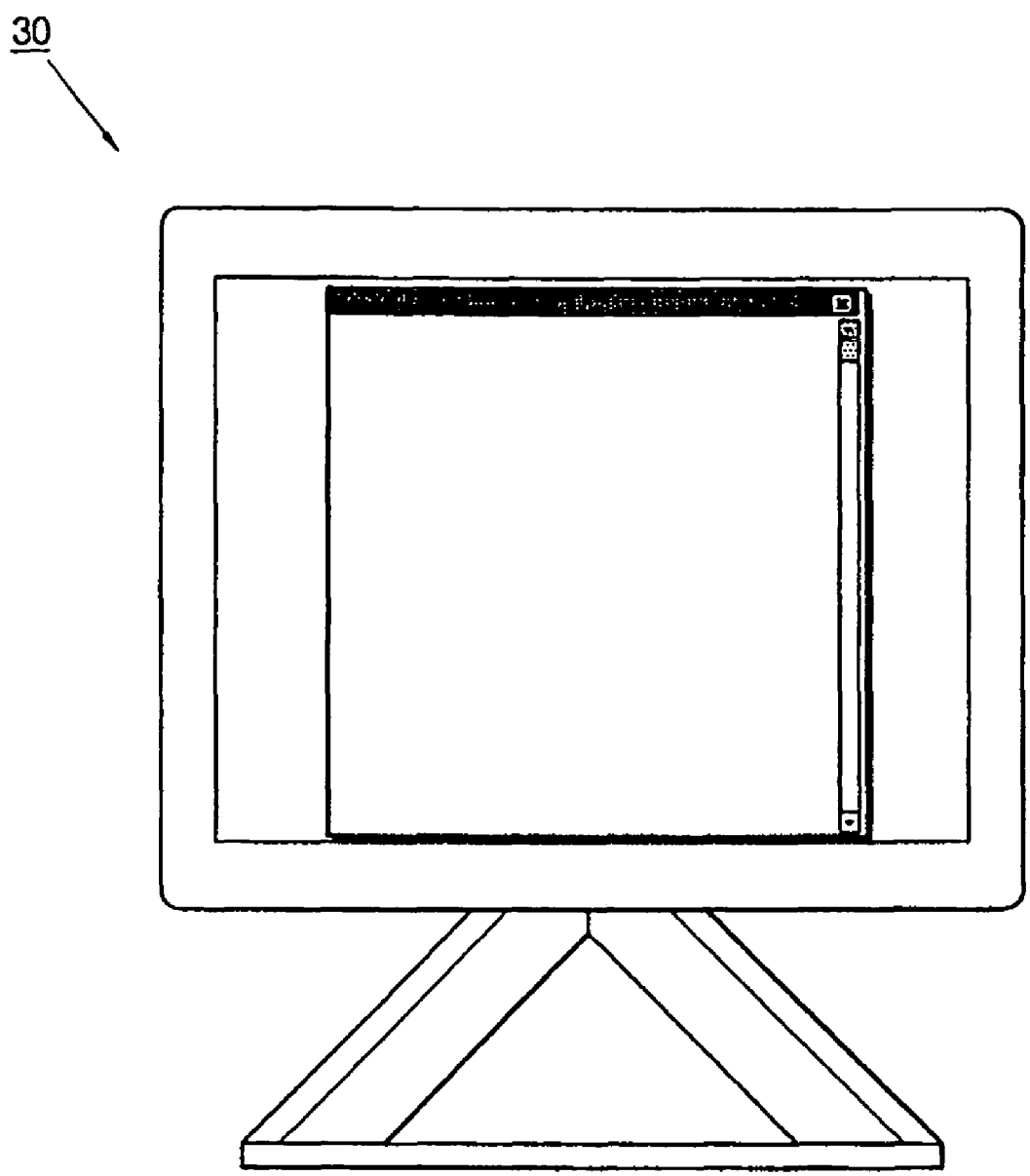
FIGS. 1 and 2 are views of a pivotable display.

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

Figure 3:
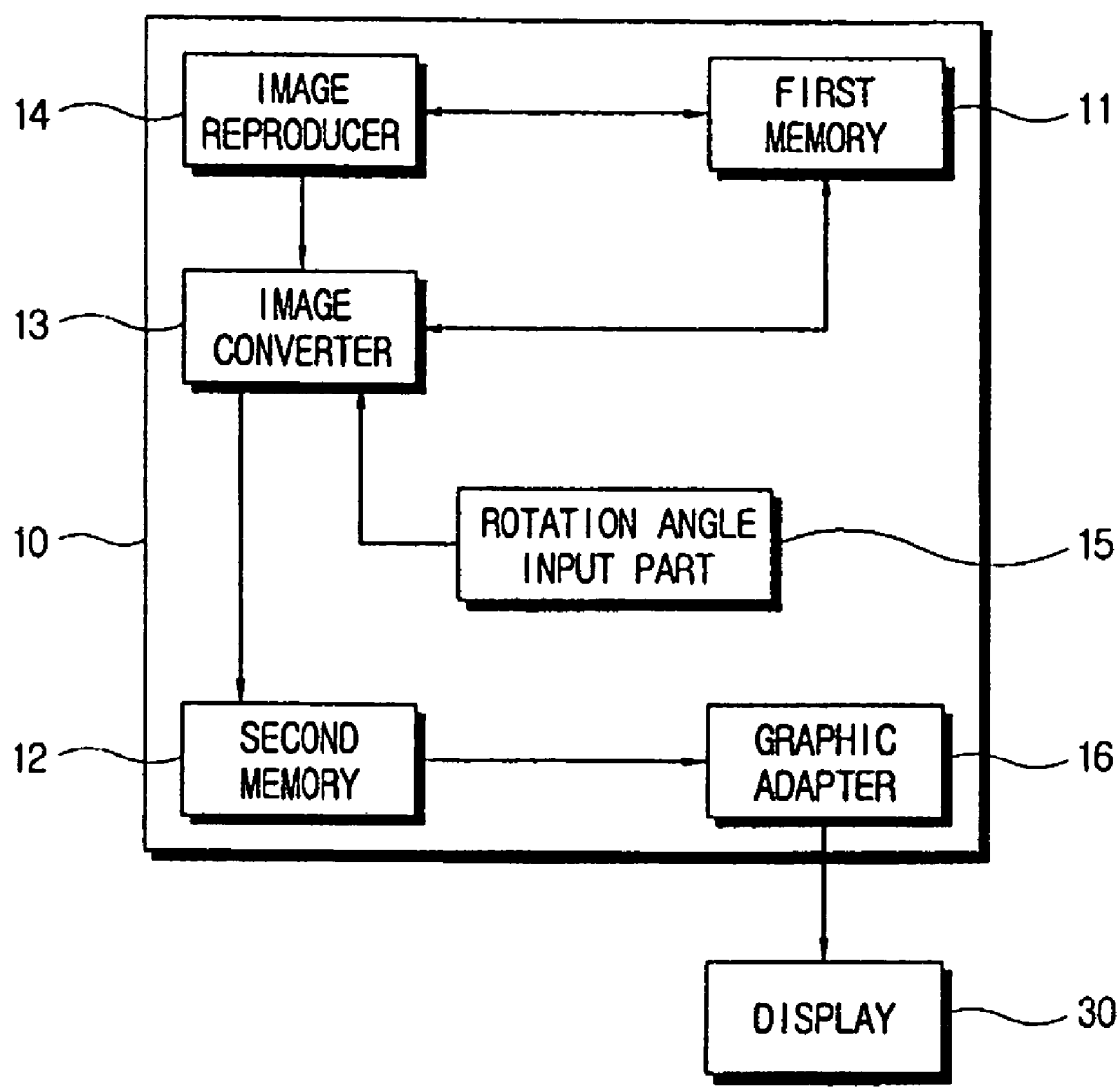
FIG. 3 is a control block diagram of a computer according to an embodiment of the present general inventive concept.

FIG. 3 is a control block diagram of a computer according to an embodiment of the present general inventive concept. As shown therein, a computer 10 according to an embodiment of the present general inventive concept outputs a video signal to a display 30.

The display 30 comprises a screen configuration based on standards that provides the screen to have a larger width than height (refer to FIG. 1). That is, the display 30 comprises the screen suitable to display a picture as a landscape format.

Figure 2:
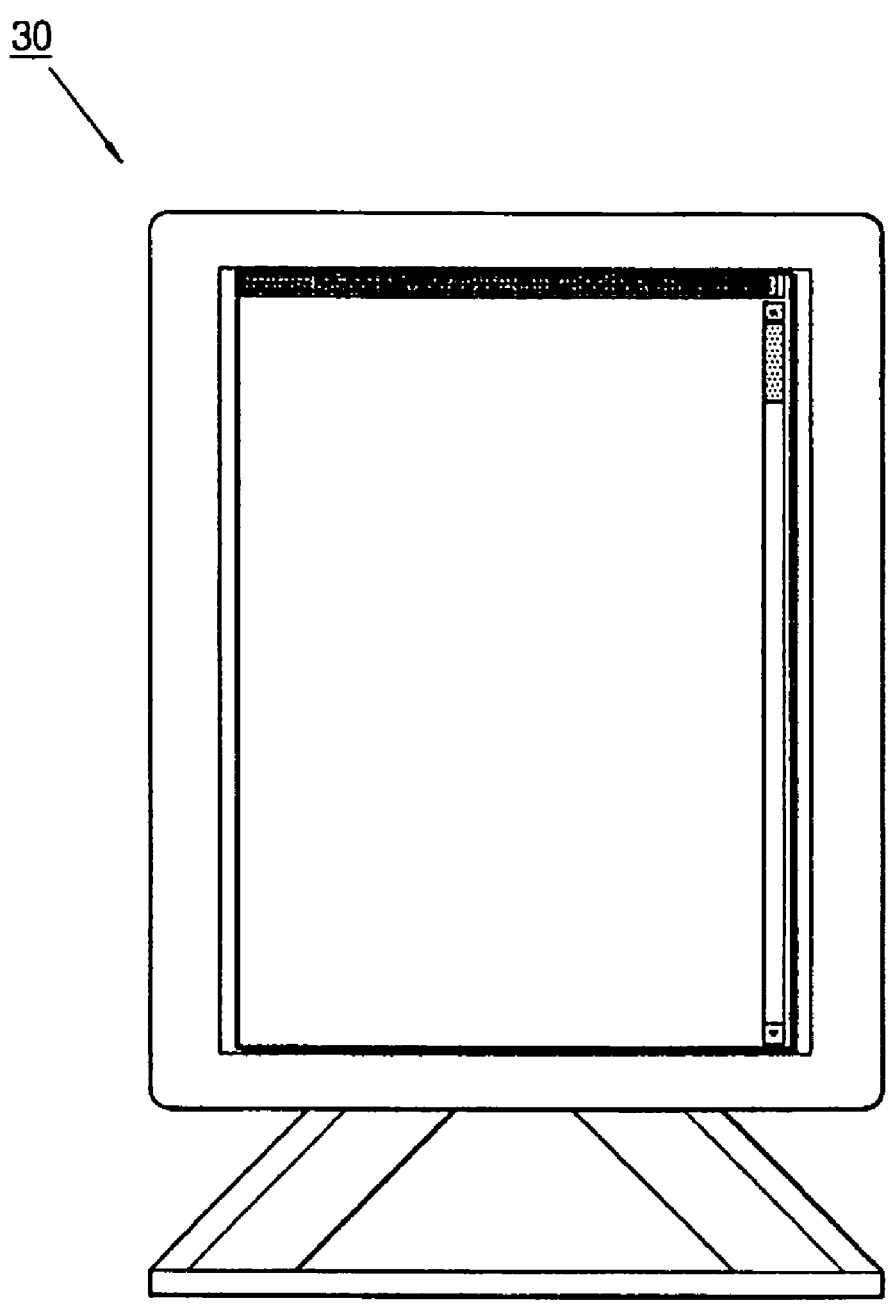

Further, the display 30 is provided pivotally at an angle of +90 degrees, −90 degrees (refer to FIG. 2) and 180 degrees with respect to a vertical axis of the screen. Herein, the pivotal configurations of the display 30 will not be described.

The computer 10 according to an embodiment of the present general inventive concept comprises a first memory 11, a second memory 12, an image reproducer 14, a image converter 13, a rotation angle input part 15, and a graphic adapter 16.

The graphic adapter 16 generates a video signal corresponding to image data stored in the second memory 12, thereby transmitting the video signal to the display 30. Here, the image data stored in the second memory 12 is used to determine whether or not the image displayed on the display 30 is rotated.

The image reproducer 14 uses the first memory 11 to reproduce the image data. According to an embodiment of the present general inventive concept, the image reproducer 14 includes an operating system (OS) of the computer 10, and an application program such as a word processor based on the OS.

The application program stores the image data for the image in the first memory 11 when it creates and displays the image on the display 30. Further, the application program instructs the operating system that the created image will be displayed on the display 30, and then the operating system instructs the image converter 13 that the created image will be displayed on the display 30.

The image data stored in the first memory 11 comprises a plurality of lines. Further, each line comprises a plurality of pixels. Here, the number (X_resolution) of lines and the number (Y_resolution) of pixels per line are determined by resolution of the image data. Meanwhile, at least one byte is allocated to each pixel, and one pixel data is stored in one byte.

The rotation angle input part 15 transmits information about an image rotation angle inputted by a user or the like to the image converter 13. Here, the rotation angle input part 15 may include a predetermined program of the computer 10, e.g., a graphic user interface (GUI) provided by the image converter 13 according to an embodiment of the present general inventive concept; and an input unit such as a keyboard, a mouse, etc., to input the image rotation angle through the GUI. Alternatively, the rotation angle input part 15 can sense a pivoting angle of the display 30 and transmit a signal corresponding to the sensed pivoting angle of the display 30 to the image converter 13.

The image converter 13 retrieves the image data stored in the first memory 11, and converts the retrieved image data stored in the first memory 11 so as to rotate the image displayed on the display 30 in correspondence with the image rotation angle inputted through the rotation angle input part 15, thereby storing the converted image data in the second memory 12.

According to an embodiment of the present general inventive concept, the image converter 13 calculates the total number (total_bytes) of the image data on the basis of the number (bytes_per_pixel) of pixel data per pixel, the number (X_resolution) of image data lines, and the number (Y_resolution) of pixels per line. Further, the image converter 13 calculates a location value (new_byte_address) of each pixel data in the second memory 12 on the basis of the number (bytes_per_pixel) of pixel data per pixel, the number (X_resolution) of image data lines, the number (Y_resolution) of pixels per line and the total number (total_bytes) of the image data through processes respectively corresponding to the image rotation angle transmitted from the rotation angle input part 15 and being independent of each other.

Further, each pixel data of the image data stored in the first memory 11 is stored in the second memory 12 on the basis of the calculated location value (new_byte_address) of each pixel data in the second memory 12.

Here, the graphic adapter 16 determines where each pixel data corresponds to a location value on a screen of the display 30 on the basis of the calculated location value (new_byte_address) of each pixel data with regard to the image data stored in the second memory 12. Further, the graphic adapter 16 generates the video signal corresponding to the image data stored in the second memory 12, thereby transmitting the video signal to the display 30.

Hereinbelow, a process of rotating the image by the image converter 13 according to an embodiment of the present general inventive concept will be described with reference to FIGS. 4 through 7.

First, at operation S10, the line number (X_resolution) of image data stored in the first memory 11 and the number (Y_resolution) of pixels per one line are set. Further, at the operation S10, the number of bytes allocated to each pixel, i.e., the number (bytes_per_pixel) of pixel data per pixel is set. In this embodiment, it is assumed that the line number (X_resolution) of the image data is four, the number (Y_resolution) of pixels per line is six, and the number (bytes_per_pixel) of pixel data per pixel is four.

At operation S11, the address (old_byte_address) of each pixel data in the first memory 11 is set. According to an embodiment of the present general inventive concept, the location value (old_byte_address) of each pixel data in the first memory 11 is set according to orders of the line and the pixel. Here, the location value (old_byte_address) of each pixel data in the first memory 11 sequentially stores each pixel data according to the address order of the first memory 11, thereby setting the location value (old_byte_address) of each pixel data in the first memory 11 as the address of the first memory 11 storing the corresponding pixel data.

When the location value (old_byte_address) of each pixel data in the first memory 11 is set as the address of the first memory 11, the location value (new_byte_address) of the second memory 12 calculated by the following process can be set as the address of each pixel data in the second memory 12.

At operation S11, an initial location value (new_base_address) of the second memory 12 to store each pixel data can be set. For example, the address of the second memory 12, in which the first recognized pixel data of the image data is stored, is set as the initial location value (new_base_address). In FIGS. 9, 10 and 11, the initial location value (new_base_address) of the second memory 12 is set as "1000", by way of example.

FIG. 8 shows a relation between the image data stored in the first memory 11 and the location value of each pixel data in the image data according to an embodiment of the present general inventive concept. In FIG. 8, numerals of the pixel data indicate the corresponding line of the pixel data, the location value of the pixel in the corresponding line, and the data location value in the corresponding pixel. For example, among the pixel data shown in FIG. 8, "B62" indicates the second pixel data of the sixth pixel on the "B" line.

Further, each pixel data is in turn stored in the first memory 11 according to a line order and a pixel order on the corresponding line. Thus, the location value (old_byte_address) of each pixel data in the first memory 11 is determined. Referring to FIG. 8, the location values (old_byte_address) of the image data in the first memory 11 are set as '0'~'95' according to the foregoing order.

Returning to FIG. 4, at operation S12, the image converter 13 calculates the total number (total_bytes) of the image data on the basis of the line number (X_resolution) of the set image data, the number (Y_resolution) of pixels per line, and the number (bytes_per_pixel) of pixel data per pixel. Here, the total number (total_bytes) of the image data is calculated by the following Equation 1.

total_bytes=X_resolution×Y_resolution×bytes_per_pixel  [equation 1]

Here, at the operation S12, the total number (total_bytes) of the image data is equal to a total counting value (total_counter) to sequentially store total pixel data of the image data in the first memory 11 according to the location values (old_byte_address) of the respective pixel data in the first memory 11.

Then, when the image rotation angle is inputted through the rotation angle input part 15, at operation S13, the image converter 13 checks whether or not the image rotation angle is of 180 degrees at operation S14. When the image rotation angle is 180 degrees, the image converter 13 calculates the location value (new_byte_address) of the pixel data in the second memory 12 with regard to the image data stored in the first memory 11 by a process A (referring to FIG. 5).

Figure 5:
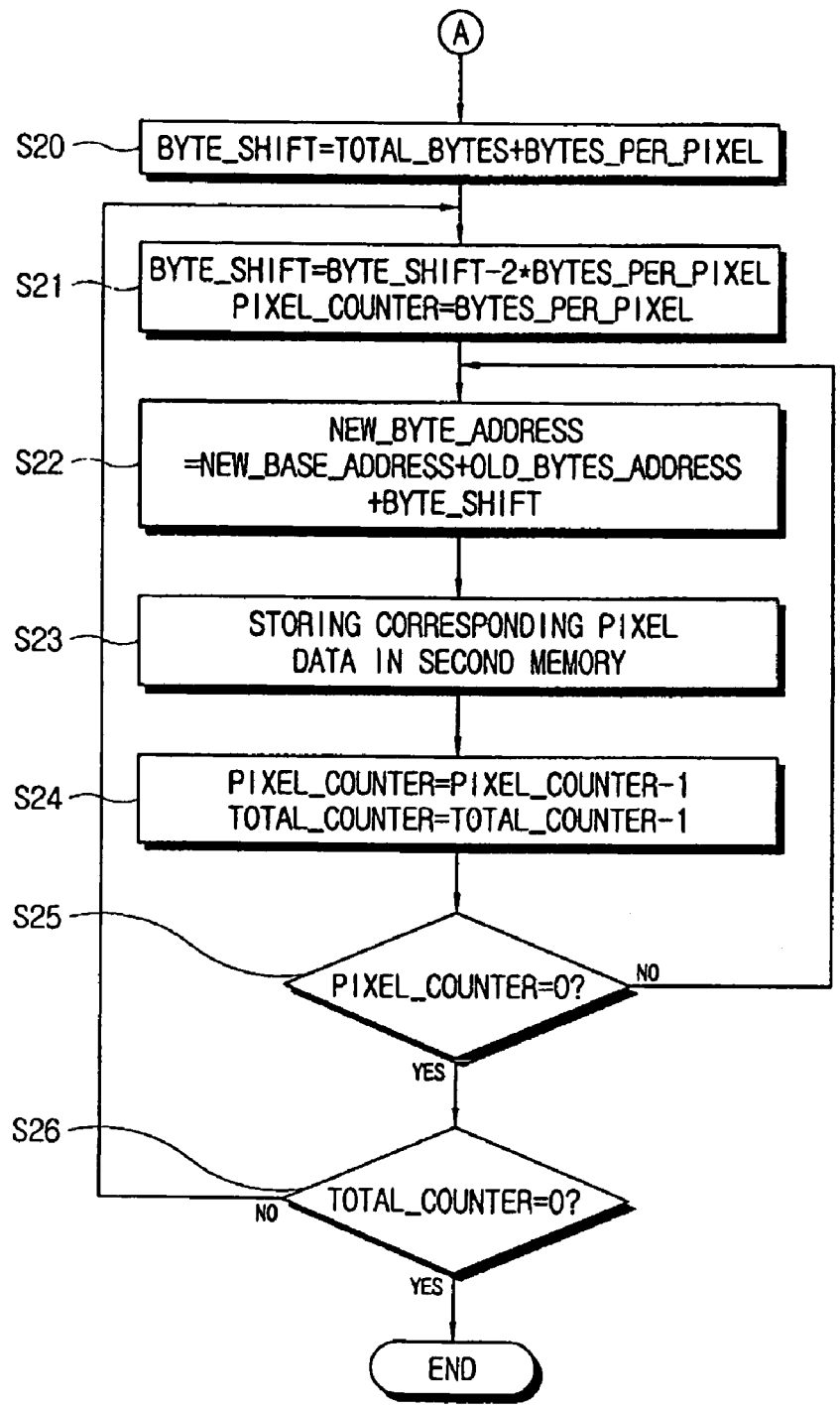

Referring to FIG. 5, the image data stored in the first memory 11 by the process A is converted and stored in the second memory 12. Here, the image data stored in the first memory 11 is sequentially stored by a pixel unit in the second memory 12 by the process A according to orders of the location values (old_byte_address) of the pixel data in the first memory 11.

First, at operation S20, a decrement parameter (byte_shift) is calculated on the basis of a total number (total_bytes) of the image data, and the number (bytes_per_pixel) of pixel data per one pixel. Here, the decrement parameter (byte_shift) is calculated by the following Equation 2.

byte_shift=total_bytes+bytes_per_pixel  [equation 2]

At operation S21, the decrement parameter (byte_shift) is processed by a subtraction of Equation 3 below according to the orders of the location values (old_byte_address) of the pixel data in the first memory 11.

byte_shift=byte_shift−2×bytes_per_pixel  [equation 3]

Then, at operation S21, a pixel counting value (pixel_counter) is set to check whether pixel data related to one pixel is completely converted. Here, the pixel counter (pixel_counter) is equal to the number of pixel data per pixel as shown in Equation 4 below.

pixel-counter=bytes_per_pixel  [equation 4]

Then, at operation S22, the location value (new_byte_address) in the second memory 12 is calculated by an Equation 5 below with respect to the corresponding pixel data.

new_byte_address=new_base_address+old_byte_address+bytes_shift  [equation 5]

Then, at operation S23, the corresponding pixel data is stored in the second memory 12 on the basis of the location value (new_byte_address) of the corresponding pixel data in the second memory 12, which is calculated by Equation 5.

Then, at operation S24, the pixel counting value (pixel_counter) and the total counting value (total_counter) are decreased by '1'. At operation S25, it is checked whether the pixel counting value (pixel_counter) is '0'. Here, the operations from S22 to S25 are repeated until the pixel counting value (pixel_counter) becomes '0', and thus the location value (new_byte_address) of the pixel data in the second memory 12 with regard to one pixel is calculated and stored in the second memory 12 at the operation S23.

Further, when the pixel counting value (pixel_counter) is '0', it is checked whether the total counting value (total_counter) is '0' at operation S26. Then, the operations from S21 to S26 are repeated until the total counting value (total_counter) becomes '0', and thus the location value (byte_address) of total pixel data in the second memory 12 is calculated and stored in the second memory 12 at the operation S23.

Hereinbelow, it will be described by way of example that the pixel data (refer to FIG. 8) stored in the first memory 11 and having the location values (old_byte_address) of '2', '3', '4' and '5', that is, "A13", "A14", "A21" and "A22" are converted by the process A (see FIG. 5), and calculated as the location values (new_byte_address) in the second memory 12. Here, the pixel data of "A13" and "A14" is converted by the process A (see FIG. 5), and stored in the location values '1094' and '1095' of the second memory 12, respectively (refer to FIG. 9).

While the pixel data of "A13" is converted, the decrement parameter (bytes_shift) is calculated into '92' by Equation 2 and Equation 3 at the operation S21. Here, the pixel data of "A13" has the location value (old_byte_address) of '2' in the first memory 11, and has the initial location value (new_base_address) of '1000' in the second memory 12, and thus the location value (new_byte_address) of the pixel data of "A13" in the second memory 12 is calculated as '1094' on the basis of Equation 5 at the operation S22.

Then, at the operation S23, the pixel data of "A13" stored in the first memory 11 is stored in the location value (new_byte_address) of '1094' of the second memory 12.

Likewise, the pixel data of "A14" is converted by the same method as the pixel data of "A13". Here, the location value (old_type_address) of the pixel data of "A14" in the first memory 11 is '3', and thus the location value (new_byte_address) of the pixel data of "A14" in the second memory 12 is calculated as '1095' on the basis of Equation 5.

Meanwhile, when the pixel of "A" is completely converted, the decrement parameter (byte_shift) is set as '84' on the basis of Equation 3. Further, the pixel counting value (pixel_counter) is set again into the number (bytes_per_pixel) of pixel data per pixel.

Further, the operation S22 is performed to convert the first pixel data of the pixel of "B", that is, the pixel data of "A21". Here, the pixel data of "A21" has the location value (old_byte_address) of '4' in the first memory 11, and has the initial location value (new_base_address) of '1000' in the second memory 12, and thus the location value (new_byte_address) of the pixel data of "A21" in the second memory 12 is calculated as '1088' on the basis of Equation 5 at the operation S22.

Then, at the operation S23, the pixel data of "A13" stored in the first memory 11 is stored in the location value (new_byte_address) of '1088' of the second memory 12.

Likewise, the pixel data of "A22" is converted by the same method as the pixel data of "A21". Here, the location value (old_type_address) of the pixel data of "A22" in the first memory 11 is '5', and thus the location value (new_byte_address) of the pixel data of "A22" in the second memory 12 is calculated as '1089' on the basis of Equation 5.

Through the foregoing processes, the location value (new_byte_address) in the second memory 12 is calculated with regard to the entire pixel data of the image data, and the corresponding pixel data is stored in the second memory 12 according to the calculated location value (new_byte_address), as shown in FIG. 9.

Figure 4:
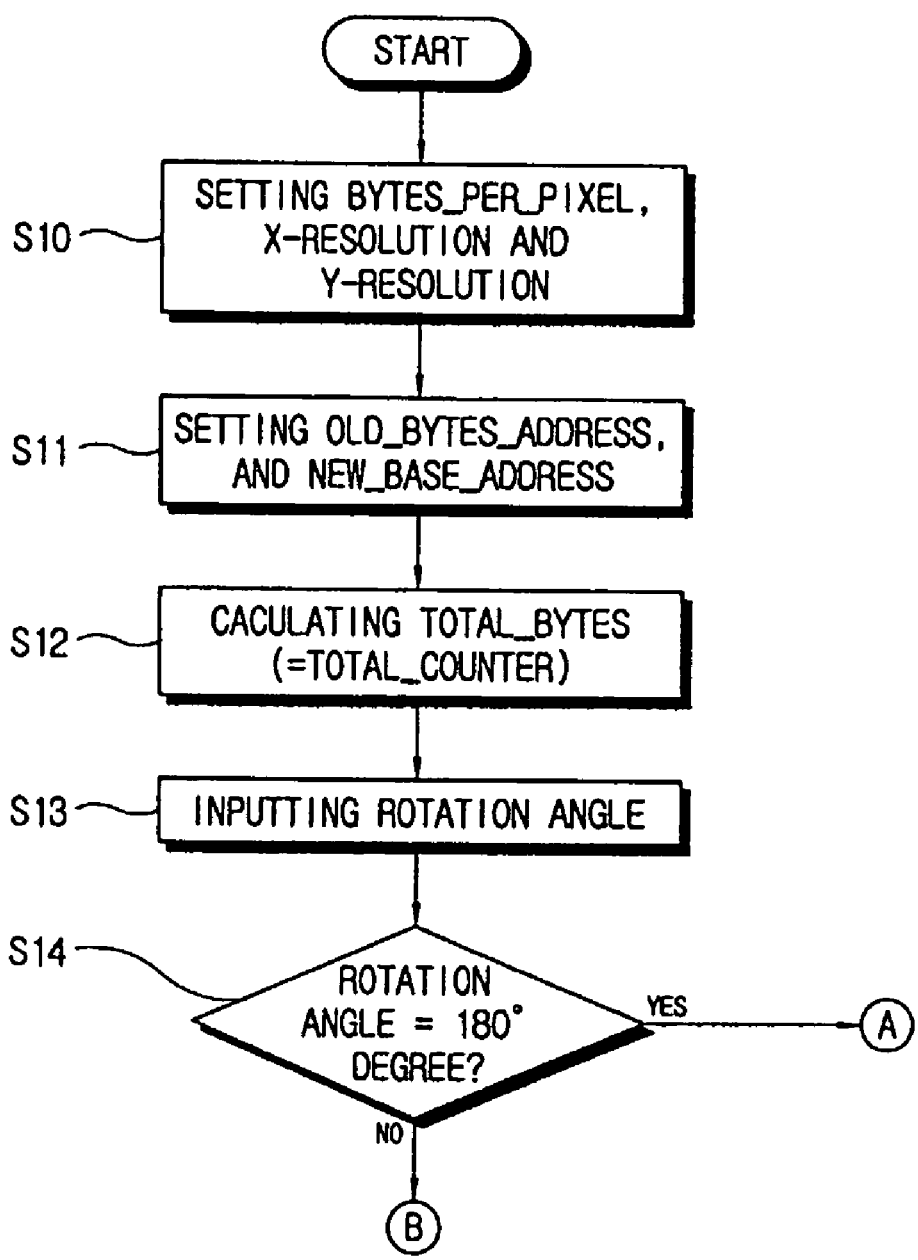
FIGS. 4 through 7 illustrate a control flowchart of a method of rotating an image according to an embodiment of the present general inventive concept.
Figure 6:
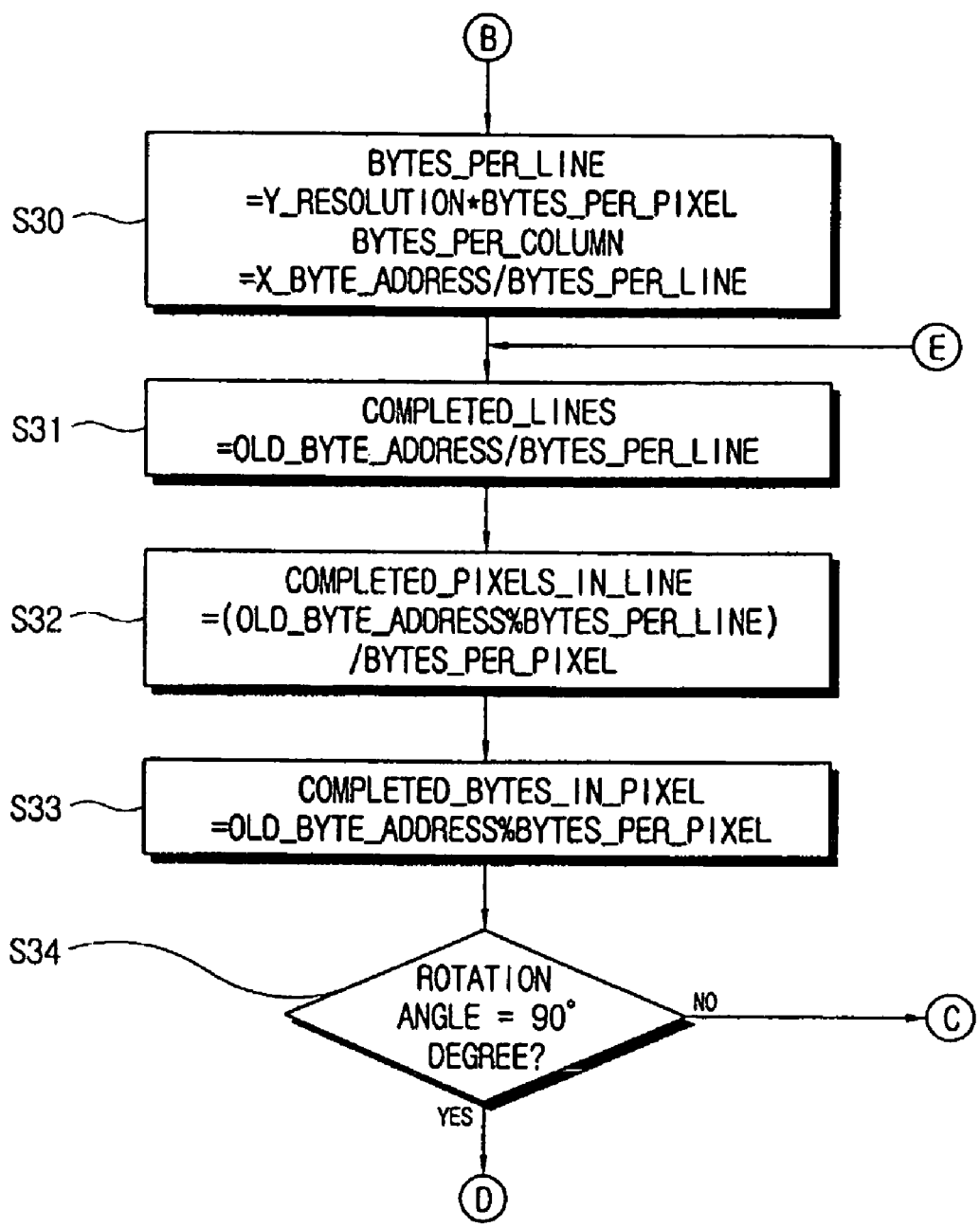

Meanwhile, when the image rotation angle is not 180 degrees at the operation S14 of FIG. 4, that is, when the image rotation angle is −90 degrees or +90 degrees, the image converter 13 is initialized for a second process or a third process as shown in FIG. 6.

First, at operation S30, the image converter 13 calculates the number (bytes_per_line) of the pixel data per line and the number (bytes_per_column) of the pixel data per column through Equation 6 and Equation 7 below.

$$bytes\_per\_line = Y\_resolution \times bytes\_per\_pixel \quad \text{[equation 6]}$$

$$bytes\_per\_column = X\_resolution \times bytes\_per\_pixel \quad \text{[equation 7]}$$

Then, at operation S31, the image converter 13 calculates the number of lines (completed_lines), of which the location value (new_byte_address) in the second memory 12 is completely calculated by this time, using Equation 8 below.

$$completed\_lines = old\_byte\_address / bytes\_per\_line \quad \text{[equation 8]}$$

Here, the complete_lines value is allocated to the program by an integer, so that the number of lines (completed_lines), of which the location value (new_byte_address) in the second memory 12 is completely calculated by this time, are calculated according to the location value (old_byte_address) of the pixel data in the first memory 11 and the number (bytes_per_line) of the pixel data per line.

Then, at operation S32, the image converter 13 calculates the number of pixels (completed_pixels_in_line), of which the location value (new_byte_address) of the corresponding line in the second memory 12 is completely calculated by this time, using Equation 9 below.

$$completed\_pixels\_in\_line = (old\_byte\_address \,\%\, bytes\_per\_line) / bytes\_per\_pixel \quad \text{[equation 9]}$$

Here, an operation code of "%" refers to calculating the rest of a division operation. Further, the complete_lines value is allocated to the program by an integer, so that the number (completed_lines_in pixel) of lines, of which the location value (new_byte_address) of the corresponding line in the second memory 12 is completely calculated by this time, is calculated on the basis of the location value (old_byte_address) of the pixel data in the first memory 11, the number (bytes_per_line) of the pixel data per line, and the number (bytes_per_pixel) of the pixel data per pixel.

Then, at operation S33, the image converter 13 calculates the number of pixels (completed_bytes_in_line), of which the location value (new_byte_address) of the corresponding pixel in the second memory 12 is completely calculated by this time, using Equation 10 below.

$$completed\_bytes\_in\_pixel = old\_byte\_address \,\%\, bytes\_per\_pixel \quad \text{[equation 10]}$$

Here, the complete_bytes_in_pixel value is allocated to the program by an integer, so that the number (completed_pixels_in line) of the pixels, of which the location value (new_byte_address) of the corresponding line in the second memory 12 is completely calculated by this time, is calculated on the basis of the location value (old_byte_address) of the pixel data in the first memory 11, and the number (bytes_per_pixel) of the pixel data per pixel.

Alternatively, the operations S31, S32 and S33 may be changed with respect to their order.

Then, at operation 34, the image converter 13 checks whether the inputted image rotation angle is of +90 degrees or −90 degrees. When the inputted image rotation angle is of −90 degrees, at operation S40, the location value (new_byte_address) of the corresponding pixel data in the second memory 12 is calculated by Equation 11 below.

$$new\_byte\_address = new\_base\_address + total\_bytes - \{(X\_resolution - 1 - completed\_lines) \times bytes\_per\_pixel + completed\_pixels\_in\_line \times bytes\_per\_column + bytes\_per\_pixel - completed\_bytes\_in\_pixel\} \quad \text{[equation 11]}$$

On the other hand, when the inputted image rotation angle is of +90 degrees, operation S50, the location value (new_byte_address) of the corresponding pixel data in the second memory 12 is calculated by Equation 12 below.

$$new\_byte\_address = new\_base\_address + (X\_resolution - 1 - completed\_lines) \times bytes\_per\_pixel + completed\_pixels\_in\_line \times bytes\_per\_column + completed\_bytes\_in\_pixel \quad \text{[equation 12]}$$

Then, at operation S41, the corresponding pixel data stored in the first memory 11 is stored in the second memory 12 on the basis of the location value (new_byte_address) of the second memory 12 calculated by Equation 11 or Equation 12.

Figure 7:
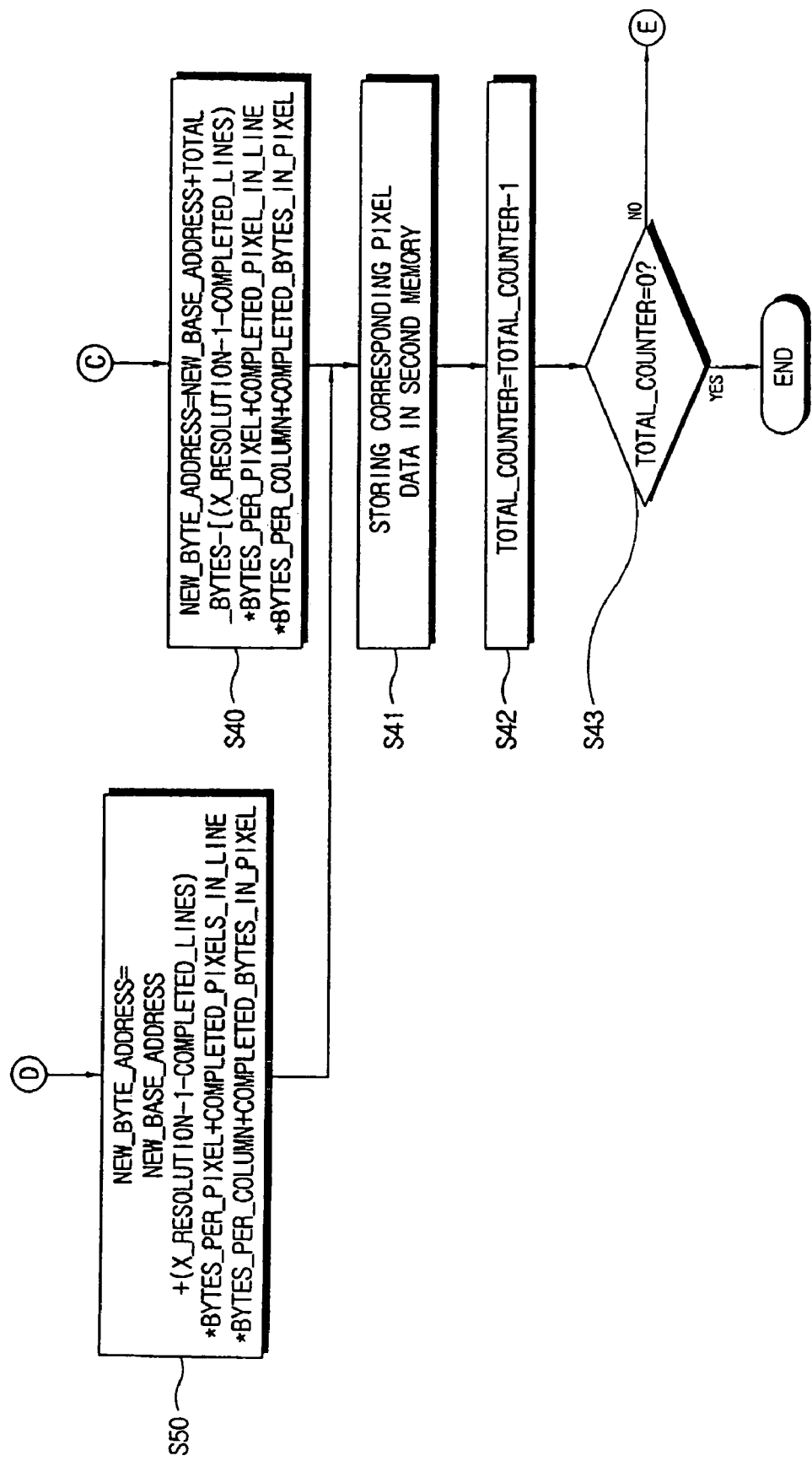

Further, at operation S42, the total counting value (total_counter) is decreased by '1' every time the location value (new_byte_address) of one pixel data in the second memory 12 is calculated and stored in the second memory 12. At operation S43, it is determined whether the total counting value (total_counter) becomes '0'. Therefore, the operations S31 through S33 of FIG. 6, the operation S40 or S50 of FIG. 7, and the operations S41 through S43 of FIG. 7 are repeated until the location value (new_byte_address) of the entire pixel data in the second memory 12 is calculated and completely stored in the second memory 12.

FIG. 10 illustrates a relation between the pixel data rotated by an angle of −90 degrees and stored in the second memory 12 and the location value (new_byte_address) of the second memory 12; and FIG. 11 illustrates a relation between the pixel data rotated by an angle of +90 degrees and stored in the second memory 12 and the location value (new_byte_address) of the second memory 12.

Hereinbelow, it will be described by way of example that the pixel data (refer to FIG. 8) stored in the first memory 11 and having the location values (old_byte_address) of '45', that is, "B62" is converted to be rotated at an angle of −90 degrees by the second process, and calculated as the location values (new_byte_address) in the second memory 12.

Through Equation 8, the number of lines (completed_lines), of which the location value (new_byte_address) in the second memory 12 is completely calculated, is calculated as '1'. Through Equation 9, the number (completed_pixels_in_line) of pixels, of which the location value (new_byte_address) of a line of "B" is completely calculated, is calculated as '5'. Through Equation 10, the number (completed_bytes_in_pixel) of the pixel data, of which the location value (new_byte_address) of the pixel data of "B62" corresponding to the pixel in the second memory 12 is completely calculated, is calculated as '1'.

Further, through Equation 6 and Equation 7, the number (bytes_per_line) of the pixel data per line and the number (bytes_per_column) of the pixel data per column are calculated as 24 and 16, respectively.

Further, through Equation 11, the location value (new_byte_address) of the pixel data of "B62" in the second memory 12 is calculated as '1005'. For reference, 1005= (1000+96−{(4−1−1)×4+5×16+4−1}).

On the other hand, when the pixel data (refer to FIG. 8) stored in the first memory 11 and having the location values (old_byte_address) of '45', that is, "B62" is converted to be rotated at an angle of +90 degrees by the third process, and calculated as the location values (new_byte_address) in the second memory 12, 1089=(1000+(4−1−1)×4+5×16+1) is calculated.

In the foregoing embodiment, a process B and a process C are correspondingly performed as shown in FIGS. 6 and 7. Alternatively, process B and process C may be independently performed.

In the foregoing embodiment, the initial location value (new_base_address) of the second memory 12 is set as '1000', but the initial location value is variable. Here, the initial location value (new_base_address) of the second memory 12 is set as '0', the initial location value (new_base_address) can be omitted in Equation 5, Equation 11 and Equation 12.

Thus, a method according to an embodiment of the present general inventive concept comprises setting the number (bytes_per_pixel) of the pixel data forming the pixel; sequentially storing the pixel data in the first memory 11 according to the line order and the pixel order; and calculating the number (total_bytes) of the entire image data on the basis of the number (bytes_per_pixel) of pixel data, the line number (X_resolution) of image data, and the number (Y_resolution) of pixels per line. Further, the method according to an embodiment of the present general inventive concept comprises setting the image rotation angle; calculating the location value (new_byte_address) of each pixel data in the second memory 12 by the independent process on the basis of the number (bytes_per_pixel) of the pixel data per one pixel, the line number (X_solution) of image data, the number (Y_resolution) of pixels per one line, and the number (total_bytes) of the entire data in consideration of the setting rotation angle; and storing the image data, from the first memory 11 in the second memory 12 on the basis of the location value (new_byte_address) of the second memory 12 calculated with regard to each pixel data. Therefore, the image data provided to the display 30 is converted, and thus the image can be rotated and displayed on the display 30 on the basis of the image data.

As described above, the present general inventive concept provides a method of transforming image data corresponding to a video signal transmitted to a display, and displaying an image based on the image data to be rotated on the display, a computer and a recording media.

Further, the present general inventive concept provides a method of gaining image data corresponding to a rotated image by different processes or equations according to rotated angles of an input image rotating an image, a computer and a recording media.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of rotating an image based on image data comprising a plurality of pixels per a line, the method comprising:

setting the number of pixel data forming the pixel;

sequentially storing the pixel data in a first memory according to an order of the line and the pixel, each pixel data being stored in at least one byte;

calculating the number of entire image data on the basis of the number of pixel data per pixel, the number of image data lines, and the number of pixels per line;

setting an image rotation angle;

calculating a location value of each pixel data in a second memory based on the number of pixel data per pixel, the number of image data lines, the number of pixels per line and the number of entire image data through independent processes corresponding to the set image rotation angle; and storing the image data from the first memory in the second memory on the basis of the calculated location value of memory of each pixel data in the second memory with regard to each pixel data.

2. The method according to claim 1, wherein a first process is performed when the image rotation angle is 180 degrees, such that the first process comprises:

calculating a decrement parameter on the basis of the number of entire image data, the number of pixel data, and the location value of the corresponding pixel data in the first memory; and calculating the location value of each pixel data in the second memory on the basis of the location value of each pixel data in the first memory, and the decrement parameter.

3. The method according to claim 2, wherein the location value of each pixel data in the second memory is calculated by an equation of:

new_byte_address=old_byte_address+byte_shift, wherein the new_byte_address is the location value of each pixel data in the second memory, the old_byte_address is the location value of each pixel data in the first memory, and the byte_shift is the decrement parameter.

4. The method according to claim 3, wherein the decrement parameter is decreased by twice the number of pixel data according to a location value order of the pixel data in the first memory.

5. The method according to claim 1, wherein a second process is performed when the image rotation angle is −90 degrees, such that the second process comprises:

calculating the number of lines of which the location value in the second memory is completely calculated;

calculating the number of pixels of which the location value of the corresponding line in the second memory is completely calculated;

calculating the number of pixel data of which the location value of the corresponding pixel in the second memory is completely calculated; and calculating the location value of each pixel data in the second memory on the basis of the number of entire image data, the number of lines, the number of pixels per line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

6. The method according to claim 5, wherein the location value of each pixel data in the second memory is calculated by an equation of:

new_byte_address=total_bytes−{(X_resolution−1−completed_lines)×bytes_per_pixel+completed_pixels_in_line×bytes_per_column+bytes_per_pixel−completed_bytes_in_pixel}, where the new_byte_address is the location value of each pixel data in the second memory, the total_bytes is the number of total data, the X_resolution is the number of lines, the completed_lines is the number of lines whose location value in the second memory is completely calculated, the bytes_per_pixel is the number of pixel data, the completed_pixels_in_line is the number of pixels whose location value of the corresponding line in the second memory is completely calculated, the bytes_per_column is calculated by multiplication of the number of lines and the number of pixel data, and the completed_bytes_in_pixel is the number of pixel data whose location value of the corresponding pixel in the second memory is completely calculated.

7. The method according to claim 1, wherein a third process is performed when the image rotation angle is +90 degrees, such that the third process comprises:
   calculating the number of lines of which the location value in the second memory is completely calculated;
   calculating the number of pixels of which the location value of the corresponding line in the second memory is completely calculated;
   calculating the number of pixel data of which the location value of the corresponding pixel in the second memory is completely calculated; and
   calculating the location value of each pixel data in the second memory on the basis of the number of lines, the number of pixels per line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

8. The method according to claim 7, wherein the location value of each pixel data in the second memory is calculated by an equation of:

$$new\_byte\_address = (X\_resolution - 1 - completed\_lines) \times bytes\_per\_pixel + completed\_pixels\_in\_line \times bytes\_per\_column + completed\_bytes\_in\_pixel,$$

where the new_byte_address is the location value of each pixel data in the second memory, the X_resolution is the number of lines, the completed_lines is the number of lines whose location value in the second memory is completely calculated, the bytes_per_pixel is the number of pixel data, the completed_pixels_in_line is the number of pixels whose location value of the corresponding line in the second memory is completely calculated, the bytes_per_column is calculated by multiplication of the number of lines and the number of pixel data, the completed_bytes_in_pixel is the number of pixel data whose location value of the corresponding pixel in the second memory is completely calculated.

9. The method according to claim 1, wherein the calculating the location value of each pixel data in the second memory comprises:
   setting an initial location value in the second memory; and
   reflecting the initial location value to the calculated location value in the second memory.

10. The method according to claim 9, wherein the location values in the first memory and the second memory are used as addresses to store the pixel data.

11. A computer outputting a video signal to a display, comprising:
   a first memory to store image data comprising a plurality of pixels per line, the pixel comprising at least one pixel data, each of the at least one pixel data being stored in at least one byte;
   a second memory;
   a rotation angle input part to input a rotation angle of an image;
   an image converter to calculate the number of entire image data on the basis of pixel data per pixel, the number of image data lines, and the number of pixels per line, to calculate a location value of each pixel data in the second memory using independent processes based on the number of pixel data per pixel, the number of image data lines, the number of pixels per line, and the number of entire image data with regard to the image rotation angle inputted through the rotation angle input part, and to store the image data from the first memory in the second memory on the basis of the calculated location value of each pixel data in the second memory; and
   a graphic adapter to output the video signal on the basis of the image data stored in the second memory.

12. The computer according to claim 11, wherein a first process is performed when the rotation angle is 180 degrees, such that the first process comprises:
   calculating a decrement parameter on the basis of the number of entire image data, the number of pixel data, and the location value of the corresponding pixel data in the first memory; and
   calculating the location value of each pixel data in the second memory on the basis of the location value of each pixel data in the first memory, and the decrement parameter.

13. The computer according to claim 12, wherein the location value of each pixel data in the second memory is calculated by an equation of:

$$new\_byte\_address = old\_byte\_address\ byte\_shift,$$

where the new_byte_address is the location value of each pixel data in the second memory, the old_byte_address is the location value of each pixel data in the first memory, and the byte_shift is the decrement parameter.

14. The computer according to claim 13, wherein the decrement parameter is decreased by twice the number of pixel data according to location value order of the pixel data in the first memory.

15. The computer according to claim 11, wherein a second process is performed when the image rotation angle is −90 degrees, such that the second process comprises:
   calculating the number of lines of which the location value in the second memory is completely calculated;
   calculating the number of pixels of which the location value of the corresponding line in the second memory is completely calculated;
   calculating the number of pixel data of which the location value of the corresponding pixel in the second memory is completely calculated; and
   calculating the location value of each pixel data in the second memory on the basis of the number of entire image data, the number of lines, the number of pixels per line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

16. The computer according to claim 15, wherein the location value of each pixel data in the second memory is calculated by an equation of:

$$new\_byte\_address = total\_bytes - \{(X\_resolution - 1 - completed\_lines) \times bytes\_per\_pixel + completed\_pixels\_in\_line \times bytes\_per\_column + bytes\_per\_pixel - completed\_bytes\_in\_pixel\},$$

where the new_byte_address is the location value of each pixel data in the second memory, the total_bytes is the number of total data, the X_resolution is the number of lines, the completed_lines is the number of lines whose location value in the second memory is completely calculated, the bytes_per_pixel is the number of pixel data, the completed_pixels_in_line is the number of pixels whose location value of the corresponding line in the second memory is completely calculated, the bytes_per_column is calculated by multiplication of the number of lines and the number of pixel data, and the completed_bytes_in_pixel is the number of pixel data whose location value of the corresponding pixel in the second memory is completely calculated.

17. The computer according to claim 11, wherein a third process is performed when the image rotation angle is +90 degrees, such that the third process comprises:

calculating the number of lines of which the location value in the second memory is completely calculated;

calculating the number of pixels of which the location value of the corresponding line in the second memory is completely calculated;

calculating the number of pixel data of which the location value of the corresponding pixel in the second memory is completely calculated; and calculating the location value of each pixel data in the second memory on the basis of the number of lines, the number of pixels per line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

18. The computer according to claim 17, wherein the location value of each pixel data in the second memory is calculated by an equation of:

new_byte_address=(X_resolution−1−completed_lines)×bytes_per_pixel+completed_pixels_in_line×bytes_per_column+completed_bytes_in_pixel, where the new_byte_address is the location value of each pixel data in the second memory, the X_resolution is the number of lines, the completed_lines is the number of lines whose location value in the second memory is completely calculated, the bytes_per_pixel is the number of pixel data, the completed_pixels_in_line is the number of pixels whose location value of the corresponding line in the second memory is completely calculated, the bytes_per_column is calculated by multiplication of the number of lines and the number of pixel data, and the completed_bytes_in_pixel is the number of pixel data whose location value of the corresponding pixel in the second memory is completely calculated.

19. The computer according to claim 11, wherein the image converter retrieves an initial location value in the second memory and reflects the initial location value to the calculated location value in the second memory.

20. The computer according to claim 19, wherein the location values in the first memory and the second memory are used as addresses to store the pixel data.

21. A non-transitory computer readable medium that includes computer-readable codes that when executed by a computer perform the method comprising: setting the number of pixel data forming the pixel; sequentially storing the pixel data in a first memory according to an order of the line and the pixel, each pixel data being stored in at least one byte; calculating the number of entire image data on the basis of the number of pixel data per pixel, the number of image data lines, and the number of pixels per line; setting an image rotation angle; calculating a location value of each pixel data in a second memory based on the number of pixel data per pixel, the number of image data lines, the number of pixels per line, and the number of entire image data through independent processes corresponding to the set image rotation angle; and storing the image data from the first memory in the second memory on the basis of the calculated location value of each pixel data in the second memory with regard to each pixel data.

22. The non-transitory computer-readable medium according to claim 21, wherein a first process is performed when the image rotation angle is 180 degrees, such that the first process comprises:

calculating a decrement parameter on the basis of the number of entire image data, the number of pixel data, and the location value of the corresponding pixel data in the first memory; and calculating the location value of each pixel data in the second memory on the basis of the location value of each pixel data in the first memory, and the decrement parameter.

23. The non-transitory computer-readable medium according to claim 22, wherein the location value of each pixel data in the second memory is calculated by an equation of:

new_byte_address=old_byte_address+byte_shift, where the new_byte_address is the location value of each pixel data in the second memory, the old_byte_address is the location value of each pixel data in the first memory, and the byte_shift is the decrement parameter.

24. The non-transitory computer-readable medium according to claim 23, wherein the decrement parameter is decreased by twice the number of pixel data according to the location value order of the pixel data in the first memory.

25. The non-transitory computer-readable medium according to claim 21, wherein a second process performed when the image rotation angle is −90 degrees, such that the second process comprises:

calculating the number of lines of which the location value in the second memory is completely calculated;

calculating the number of pixels of which the location value of the corresponding line in the second memory is completely calculated;

calculating the number of pixel data of which the location value of the corresponding pixel in the second memory is completely calculated; and calculating the location value of each pixel data in the second memory on the basis of the number of entire image data, the number of lines, the number of pixels per line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

26. The non-transitory computer-readable medium according to claim 25, wherein the location value of each pixel data in the second memory is calculated by an equation of:

new_byte_address=total_bytes−{(X_resolution−1−completed_lines)×bytes_per_pixel+completed_pixels_in_line×bytes_per_column+bytes_per_pixel−completed_bytes_in_pixel}, where the new_byte_address is the location value of each pixel data in the second memory, the total_bytes is the number of total data, the X_resolution is the number of lines, the completed_lines is the number of lines whose location value in the second memory is completely calculated, the bytes_per_pixel is the number of pixel data, the completed_pixels_in_line is the number of pixels whose location value of the corresponding line in the second memory is completely calculated, the bytes_per_column is calculated by multiplication of the number of lines and the number of pixel data, and the completed_bytes_in_pixel is the number of pixel data whose location value of the corresponding pixel in the second memory is completely calculated.

27. The non-transitory computer-readable medium according to claim 21, wherein a third process is performed when the image rotation angle is +90 degrees, such that the third process comprises:

calculating the number of lines of which the location value in the second memory is completely calculated;

calculating the number of pixels of which the location value of the corresponding line in the second memory is completely calculated;

calculating the number of pixel data of which the location value of the corresponding pixel in the second memory is completely calculated; and calculating the location value of each pixel data in the second memory on the basis of the number of lines, the number of pixels per line, the number of lines whose location value in the second memory is completely calculated, the number of pixel data, the number of pixels whose location value of the corresponding line in the second memory is completely calculated, and the number of pixel data whose location value of the corresponding pixel in the second memory is completely calculated.

28. The non-transitory computer-readable medium according to claim 27, wherein the location value of each pixel data in the second memory is calculated by an equation of:

$$\text{new\_byte\_address} = (X\_\text{resolution} - 1 - \text{completed\_lines}) \times \text{bytes\_per\_pixel} + \text{completed\_pixels\_in\_line} \times \text{bytes\_per\_column} + \text{completed\_bytes\_in\_pixel},$$

where the new_byte_address is the location value of each pixel data in the second memory, the X_resolution is the number of lines, the completed_lines is the number of lines whose location value in the second memory is completely calculated, the bytes_per_pixel is the number of pixel data, the completed_pixels_in_line is the number of pixels whose location value of the corresponding line in the second memory is completely calculated, the bytes_per_column is calculated by multiplication of the number of lines and the number of pixel data, and the completed_bytes_in_pixel is the number of pixel data whose location value of the corresponding pixel in the second memory is completely calculated.

29. An apparatus to transform an image on a display, comprising:

a first memory to store image data corresponding to the image and comprising a plurality of pixels per line, each pixel comprising at least one pixel data, each of the at least one pixel data being stored in at least one byte;

an image converter to calculate a number of the image data based on the pixel data, a number of image data lines, and a number of pixels per line;

a second memory to store the image data in locations based on the number of pixel data per pixel, the number of image data lines, the number of pixels per line, and the number of entire image data through independent processes corresponding to the set image rotation angle; and a graphic adapter to output a video signal based on the image data stored in the second memory.

30. The apparatus of claim 29, wherein the locations in which the image data are stored in the second memory are calculated based on each individual pixel data, the number of image data lines, the number of pixels per line, and the number of the image data.

* * * * *